United States Patent Office 3,212,506
Patented Oct. 19, 1965

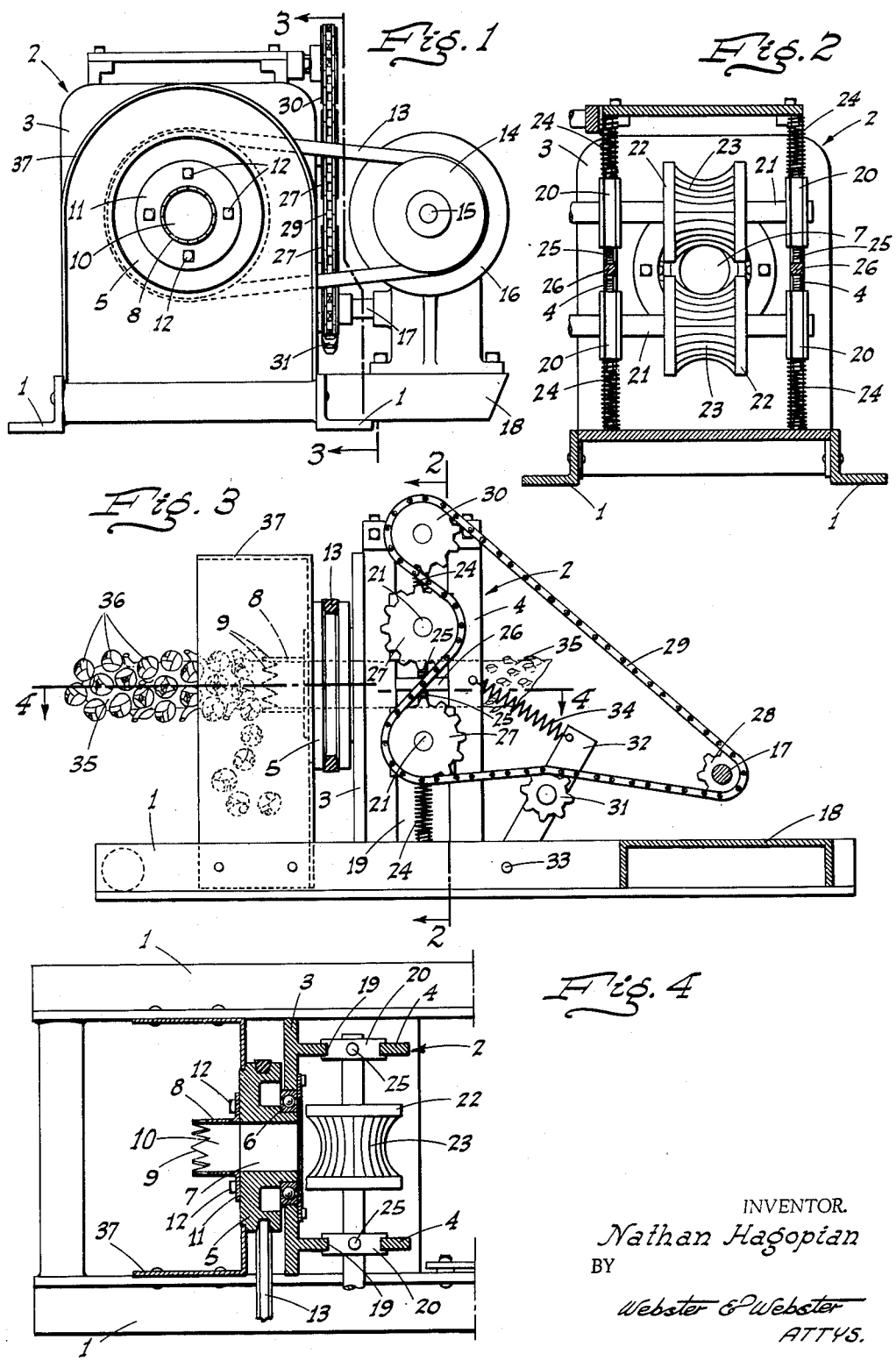

3,212,506
BRUSSELS SPROUTS STRIPPING MACHINE
Nathan Hagopian, Fresno, Calif., assignor to Commercial Manufacturing & Supply Co., Fresno, Calif., a corporation of California
Filed Feb. 28, 1964, Ser. No. 348,195
2 Claims. (Cl. 130—30)

This invention relates to vegetable handling machines, and particularly to one for removing the individual sprouts from Brussels sprouts plants after the latter have been cut from the ground.

The machine of the present invention has been designed in view of the introduction of a new variety of Brussels sprouts plant, and which is known as the "Jade." In this variety, the sprouts develop, and mature all at one time, on and about a heavy rigid stalk of substantial length. This simultaneous maturing of all the sprouts on a stalk enables the entire crop of the plant to be harvested therefrom at one time.

It is, therefore, the major object of this invention to provide a power actuated machine to which each such stalk, after being cut from the ground, is individually fed and by means of which all the sprouts on the stalk will be cut off and stripped therefrom cleanly and without damage.

It is also an important object of the invention to provide a machine, for the purpose described, which will maintain the cut off sprouts separated from the stalk from which the sprouts have been stripped, and discharge such sprouts to a point at which they may be readily accumulated for transfer to a freezing or other processing plant.

A further object of the invention is to provide a Brussels sprouts stripping machine which is designed for ease and economy of manufacture.

A still further object of the invention is to provide a practical, reliable, and durable Brussels sprouts stripping machine and one which is exceedingly effective for the purpose for which it is designed.

These objects are accomplished by means of such structure and relative arrangement of parts as will fully appear by a perusal of the following specification and claims.

In the drawings:

FIG. 1 is a front or entry end elevation of the machine.

FIG. 2 is a fragmentary transverse sectional elevation of the machine; the view looking toward the front end thereof, and being taken on line 2—2 of FIG. 3.

FIG. 3 is a side elevation of the machine, but with the operating motor cut away as at line 3—3 of FIG. 1.

FIG. 4 is a fragmentary sectional plan view of the machine, taken on line 4—4 of FIG. 2.

Referring now more particularly to the drawings and to the characters of reference marked thereon, the machine of the present invention comprises somewhat elongated transversely spaced beams 1 suitably connected together in rigid relation to form a base which is adapted to be mounted on a table or bench, or in any elevated manner relative to a floor as may be desired.

Secured to and upstanding between the beams 1 intermediate the ends thereof is a rigid frame indicated generally at 2. This frame comprises a transverse upstanding plate 3 which faces the entry end of the machine, and a pair of side plates 4 which project rearwardly from the plate 3 in somewhat widely spaced relation to each other.

Disposed just in front of the plate 3 centrally of the width and intermediate the top and bottom thereof is a pulley 5; the latter being rotatably supported from said plate 3 by an anti-friction bearing 6. The pulley 5 is tubular, providing a central cylindrical passage 7 therethrough; said passage 7 also opening through plate 3.

Projecting forwardly from the pulley 5 is a tubular, cylindrical, sprout cutter (and stripper) 8 having a peripheral row of teeth 9 about its forward edge. The cylindrical passage 10 through the cutter 8 is the same size as and alined with the pulley passage 7 as clearly shown in FIG. 4, and said cutter 8 is provided with an outwardly projecting base flange 11 which abuts against and is removably secured to the adjacent face of the pulley 5 by cap screws 12. The cutter 8 may thus be easily removed, when the teeth 9 require resharpening or it is desired to install a new cutter, without disturbing any other part of the machine.

An endless driving belt 13 connects the pulley 5 with the pulley 14 on the end of the high speed shaft 15 of an electric motor unit 16 which includes a geared-down or slow speed driven shaft 17 disposed below the shaft 15 and at a right angle thereto. The motor unit 16 is mounted on a bed 18 disposed to one side of the base and rigidly secured to the adjacent beam 1; the motor unit being positioned on the bed so that the shaft 17 extends laterally inwardly some distance to the rear of the frame 2.

The side plates 4 are each formed with a vertical slot 19; the two slots being in transverse alinement and each forming a guide for vertically spaced bearing blocks 20 in which transversely extending shafts 21 are journaled. Friction rollers 22 are fixed on the shafts 21 and these rollers are formed with concavely curved friction faces 23. Such friction faces 23 are centrally disposed relative to the pulley passage 7, but the radius of said faces is somewhat greater than that of such passage; the rollers 22 being disposed a short distance only rearwardly of the frame plate 3 as shown in FIG. 4.

Opposed compression springs 24 are mounted in the vertical slots 19 above the upper blocks 20 and below the lower blocks 20 and tend to yieldably force said blocks, and consequently the friction rollers 22, toward each other. The extent of such movement of each pair of blocks is limited by the engagement of adjustable stops 25, projecting from the adjacent faces of the blocks 20, with a cross bar 26 fixed with the corresponding side plate 4 and bridging the slot 19. This arrangement prevents the friction rollers 22 from contacting each other, but maintains their concave faces 23 spaced apart a distance less than the diameter of the pulley passage 7.

The shafts 21, on their ends which face the motor unit 16, are provided with like sized sprockets 27, while the drive shaft 17 of such unit is also provided with a sprocket 28. An endless drive chain 29 is trained about the sprockets 27, 28 and an idler sprocket 30 mounted on the frame 2 above the upper sprocket 27, in such a manner that said sprockets 27, and consequently the friction rollers 22, will be driven in opposite directions. The direction of drive of the sprockets and rollers is such that the adjacent faces of said rollers turn toward the rear or away from the pulley 5 and the cutter 8 thereon.

In order to enable the sprockets 27, and the friction rollers 22, to separate from each other if necessary while maintaining the chain under proper tension, the lower run of said chain is engaged from below by a take-up sprocket 31. This sprocket is mounted on a normally angularly disposed arm 32 pivoted at its lower end on the adjacent beam 1 as at 33. The normal upward slope of the arm 32 is away from the adjacent plate 4 as shown in FIG. 3, and a tension spring 34 connects between the upper end of said arm and said plate; the spring tending to pull the arm 32 to an upright position and which urges sprocket 31 in a chain tightening direction.

In the operation of the above described Brussels sprouts stripping machine, with the motor unit 16 in operation and the cutter 8 and the friction wheels 22 rotating, a sprouts stalk 35—to be stripped—is initially fed by hand and butt end first through the cutter 8 and the continuous cylindrical passageway formed by said cutter 8 and pulley 5. Upon the stalk being thus fed and advanced, the sprouts 36 on the stalk are cut off and cleanly stripped away by the rapidly revolving teeth 9. When the lead and bare portion of the stalk 35 passes between and is engaged by the friction rollers 22, the latter then take the place of the hand feed and pulls the remainder or trailing portion of the stalk through the cutter 8 and the aforesaid passageway, thus completing the cutting and stripping of the sprouts from the stalk. Each stalk, when released from the friction rollers 22, is bare of sprouts and drops from said rollers for discard in any suitable manner.

The cut and stripped sprouts drop in front of the transverse frame plate 3 and hence are desirably separated from the discarded stalks; such sprouts, upon so dropping, being accumulated, as in containers, for transfer to a plant for freezing or other processing.

In order to prevent the sprouts, as they are cut and stripped, from being possibly thrown about by the action of the rapidly revolving cutter 8, a hood 37 is secured to the beams 1 in upstanding relation to and about said cutter; such hood extending ahead of the pulley 5 and being open at the front and at the bottom as shown.

From the foregoing description, it will be readily seen that there has been produced a machine as substantially fulfills the objects of the invention, as set forth herein.

While this specification sets forth in detail the present and preferred construction of the machine, still in practice such deviations from such detail may be resorted to as do not form a departure from the spirit of the invention, as defined by the appended claims.

Having thus described the invention, the following is claimed as new and useful and upon which Letters Patent is desired:

1. A machine, for cutting and stripping sprouts from a severed stalk of a Brussels sprouts plant, comprising transversely spaced longitudinal and horizontal base beams, a frame upstanding from and mounted on the beams intermediate their ends, said frame including a transverse vertical face plate and transversely spaced rearwardly projecting vertical side plates, said side plates each providing a vertical slot and said slots being in transverse alinement, a tubular pulley disposed in front of and opening through the transverse face plate, a bearing journaling the pulley on the face plate, a tubular cutter projecting forwardly from the pulley in axial alinement therewith, a flange on the rear end of said cutter projecting outwardly therefrom and abutting and detachably secured against the forward face of the pulley, teeth on and about the front end of the cutter, a pair of transverse-axis friction rollers disposed between the side plates rearwardly of but adjacent the transverse face plate, the rollers being spaced apart vertically to register with the opening through the pulley and to grip a stalk passing between said rollers, transverse shafts on which said rollers are fixed, separate bearing blocks for the shafts slidable in the side plate slots, springs yieldably resisting movement of the blocks away from each other, sprockets on the shafts at one end thereof, a motor unit mounted on the base on the same side thereof as and outwardly of the sprockets, said unit including a drive shaft parallel to the axis of the pulley and another drive shaft parallel to the roller shafts, a pulley on the first named drive shaft alined with the first named pulley, a belt drive connecting said pulleys, a drive sprocket on said other drive shaft disposed in the transverse plane of the first named sprockets, and a chain drive embracing all said sprockets and trained thereabout so that the adjacent faces of the rollers will turn toward the rear.

2. A machine, as in claim 1, in which the pulleys and belt drive, and the sprockets and chain drive, are arranged so that said cutter will be rotated at a materially higher speed than the rollers.

References Cited by the Examiner
UNITED STATES PATENTS

| | | | |
|---|---|---|---|
| 10,003 | 9/53 | Dickerson | 130—9 |
| 32,649 | 6/61 | Rhoades | 130—31 |
| 2,455,449 | 12/48 | Thames | 130—9.2 |
| 2,467,052 | 4/49 | Roberts | 130—9.1 XR |
| 2,787,273 | 4/57 | Kerr | 130—9.2 |
| 3,175,561 | 3/65 | Oldershaw | 130—30 |

ABRAHAM G. STONE, *Primary Examiner.*